Patented June 24, 1930

1,766,059

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.  Application filed January 21, 1929. Serial No. 334,102.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil," "roily oil," "emulsified oil" and "bottom settlings."

We have discovered that tannin bodies are capable of being used successfully as treating agents or demulsifying agents in the resolution of petroleum emulsions of the water-in-oil type. Accordingly, we have devised a process for "breaking" such emulsions that contemplates subjecting the emulsion to the action of a treating agent or demulsifying agent that contains a tannin body, thereby causing the emulsion to break down and separate into its component parts of oil and water or brine when the emulsion is permitted to remain in a quiescent state after treatment. Such a process is efficient, it is inexpensive to practice and it is distinguished from prior chemical processes for breaking petroleum emulsions of the water-in-oil type, in that it employs as a treating agent or demulsifying agent, a substance or material not heretofore used for that purpose.

Tannin bodies, particularly tannin, tannic acid, gallotannin, and gallo-tannic acid which are representative of a large class of substances that are found in many plants, have the following distinguishing characteristics, i. e., they have an astringent taste; they give a blue-black or green coloration with ferric salts; they are capable of being precipitated by a solution of gelatin, by albumin and by alkaloids; and they unite with hide to form leather. In employing such substances as treating agents or demulsifying agents in the resolution of petroleum emulsions, they can be used in various forms. For example, they may be used in the form of water-soluble salts, such as ammonium, sodium or potassium salts of tannic or gallo-tannic acid; they may be acidified slightly with a mineral acid or used in an alkaline state; they may be used in a dilute state, concentrated state or solid state; and they may be mixed with, or applied to, the emulsion being treated, either in the form of a dry powder, or as a solution in water, or suspended in or emulsified in oil. When used in the form of a dry powder, the powder can be suspended in oil, or else an aqueous solution can be emulsified in oil by the presence of an emulsifying agent, such as calcium oleate.

Although tannin bodies of the kind above referred to are valuable demulsifying agents by virtue of their own properties, we have found that an efficient demulsifying agent for the resolution of petroleum emulsions of the water-in-oil type can be produced by mixing a tannin body with a substance or substances of the kind heretofore used for treating petroleum emulsions of the water-in-oil type, such as water softeners, modified fatty acids, etc.

While various kinds of tannin bodies, in various forms, may be employed as the treating agent or demulsifying agent of our process, we prefer to use a treating agent consisting of an aqueous solution of sodium tannate, or any suitable tanning extract, such as is used in the manufacture of leather.

In practicing our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of an oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results.

For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing a tannin body.

2. A process for breaking a petroleum emulsion of the water-in-oil type, which consists in subjecting the emulsion to the action of a demulsifying agent containing a water-soluble tannin body.

3. A process for breaking a petroleum emulsion of the water-in-oil type, which consists in subjecting the emulsion to the action of a demulsifying agent containing sodium tannate.

MELVIN DE GROOTE.
LOUIS T. MONSON.